United States Patent
Hämäläinen et al.

(10) Patent No.: US 6,240,079 B1
(45) Date of Patent: *May 29, 2001

(54) DATA TRANSMISSION METHOD IN A TDMA MOBILE COMMUNICATION SYSTEM

(75) Inventors: Jari Hämäläinen, Tampere; Jari Vainikka; Zhi-Chun Honkasalo, both of Vantaa; Harri Jokinen, Hiisi; Harri Posti, Oulu, all of (FI)

(73) Assignee: Nokia Telecommunications Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/817,331

(22) PCT Filed: Sep. 26, 1995

(86) PCT No.: PCT/FI95/00527

§ 371 Date: Jun. 30, 1997

§ 102(e) Date: Jun. 30, 1997

(87) PCT Pub. No.: WO96/10305

PCT Pub. Date: Apr. 4, 1996

(30) Foreign Application Priority Data

Sep. 27, 1994 (FI) .......................................... 944488

(51) Int. Cl.⁷ ..................................................... H04B 7/212
(52) U.S. Cl. ............................................. 370/337; 455/452
(58) Field of Search ..................................... 370/468, 329, 370/346, 347, 348, 330, 336, 337, 335, 342, 321, 322; 455/516, 414, 452, 553; 375/216

(56) References Cited

U.S. PATENT DOCUMENTS

| | | | |
|---|---|---|---|
| 4,887,265 | * 12/1989 | Felix | 370/94.1 |
| 4,949,395 | 8/1990 | Rydbeck . | |
| 5,070,536 | * 12/1991 | Mahany et al. | 455/67.4 |
| 5,128,959 | * 7/1992 | Bruckert | 375/1 |
| 5,200,956 | 4/1993 | Pudney et al. . | |
| 5,483,676 | * 1/1996 | Mahany et al. | 455/67.4 |
| 5,513,183 | * 4/1996 | Kay et al. | 370/95.3 |
| 5,535,207 | * 7/1996 | Dupont | 370/433 |
| 5,654,969 | * 8/1997 | Wilhelmsson | 370/460 |
| 5,742,592 | * 4/1998 | Scholefield et al. | 370/329 |

FOREIGN PATENT DOCUMENTS

| | | |
|---|---|---|
| 2112762 | 7/1994 | (CA) . |
| 332 818 | 9/1989 | (EP) . |
| 615 393 | 9/1994 | (EP) . |

* cited by examiner

*Primary Examiner*—David R. Vincent
(74) *Attorney, Agent, or Firm*—Pillsbury Winthrop LLP

(57) ABSTRACT

In a cellular communication system, multiple TDMA time slot channels may be assigned to a single mobile station. The network may dynamically adjust, during a call, the number of channels assigned to any one mobile station based on resources available to the network and based on a level of service desired by the mobile station. In this manner, mobile stations having varying bandwidth requirements can be efficiently served by a single communication system.

15 Claims, 3 Drawing Sheets

| 0 | 1 | 2 | | 2045 | 2046 | 2047 |
|---|---|---|---|---|---|---|

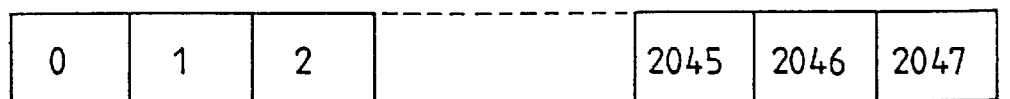
FIG. 2
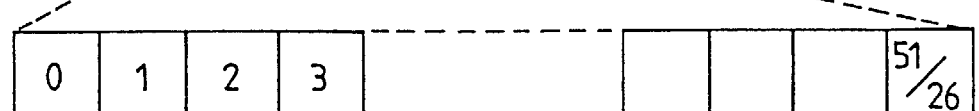
FIG. 3
FIG. 4
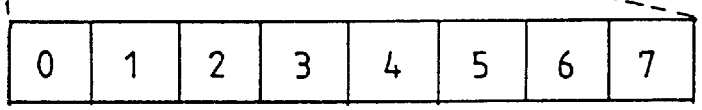
FIG. 5
FIG. 6

DATA TRANSMISSION METHOD IN A TDMA MOBILE COMMUNICATION SYSTEM

This application is the national phase of international application PCT/FI95/00527 filed Sep. 26, 1995 which designated the U.S.

FIELD OF THE INVENTION

The invention relates to a method for data transmission in a time division multiple access (TDMA) mobile communication system, comprising the step of assigning one or more time-slots to a mobile station for data transmission depending on the data transfer rate required by an application using the mobile station.

BACKGROUND OF THE INVENTION

In mobile telecommunication systems of the time division multiple access (TDMA) type, time-division communication takes place on the radio path in successive TDMA frames, each of which consists of several time-slots. In each time-slot, a short information packet is sent in form of a radio frequency burst which has a finite duration and which consists of a set of modulated bits. The time-slots are mainly used for conveying control channels and traffic channels. On the traffic channels, speech and data are transmitted. On the control channels, signalling between a base station and mobile subscriber stations is carried out. An example of a TDMA radio system is the Pan-European mobile communication system GSM (Global System for Mobile Communications).

For communication in conventional TDMA systems, each mobile station is assigned one channel time-slot for data or speech transmission. Thus, the GSM system, for instance, may have up to eight parallel connections to different mobile stations on a same carrier frequency. The maximum data transfer rate on one traffic channel is restricted to a relatively low level, depending on the available channel bandwidth, as well as the channel coding and error correction used in the transmission. In the GSM system, for instance, the user rate is 9.6 kbit/s or 12 kbit/s. In addition, in the GSM system a so-called half-rate (max. 4.8 kbit/s) traffic channel may be chosen for low speech coding rates. A half-rate channel is established when a mobile station communicates in a certain time-slot only in every second time-slot, i.e. at half-rate. A second mobile station communicates in every second time-slot of the same frame. The capacity of the system in terms of the number of subscribers may thus be doubled, in other words, up to 16 mobile stations may communicate simultaneously on the same carrier frequency.

In the last few years, the need for high-speed data services in mobile communication networks has remarkably increased. Data transfer rates of at least 64 kbit/s would be required for utilizing ISDN (Integrated Services Digital Network) circuit switched digital data services, for example. Data services of the public network PSTN, such as modems and telefax terminals of class G3, require higher transfer rates, such as 14.4 kbit/s. One of the growing areas of mobile data transfer that requires higher transfer rates than 9.6 kbit/s is the mobile video service. Services of this kind include e.g. security control by cameras, and video databases. The minimum data transfer rate in video transfer may be, for instance, 16 or 32 kbit/s.

The data transfer rates of the present mobile communication networks are not, however, adequate to satisfy these new needs.

One way to solve the problem is to use multiple TDMA time-slots for communication with a mobile station. In this way, one mobile station may transmit and receive data at higher data transfer rates by multiplexing the data to multiple time-slots (traffic channels). This is termed as multi-slot access technique.

When multiple time-slots are used for communication with one mobile station, problems arise if a sufficient number of traffic channels in not available. This may occur in the call set-up phase or in a handover. Handover refers to transferring the mobile station from one channel onto another channel of the same cell or an adjacent cell during an ongoing call. A problem arises if the mobile station is operating at a high data transfer rate, and the new cell can not provide after the handover a data transfer rate as high as that of the previous cell. One solution would be to interrupt the connection if the quality i.e. the data transfer rate of the data transfer service is not adequate in the call set-up or handover, or after-the handover. However, this solution is not acceptable.

SUMMARY OF THE INVENTION

An object of the present invention is to relieve the problems caused by capacity restrictions in a mobile communication network which employs the multi-slot access technique in data transmission.

This is achieved with the method for data transmission in a time division multiple access (TDMA) mobile communication system comprising the step of assigning one or more time-slots to a mobile station for data transmission, depending on the data transfer rate required by an application using the mobile station. The method is characterized by determining minimum and maximum requirements for the data transfer rate of the user data for the connection, and by dynamically adjusting the channel configuration consisting of one or more time-slots and assigned to the mobile station for a data call, within the limits of said minimum and maximum requirements of the data channel, depending on a varying allocation level of the resources of a mobile communication network.

In the invention, the data transfer rate of a data call is dynamically adjusted depending on the resources of the network in a mobile communication system employing a so-called multi-slot access technique, by determining minimum and maximum requirements for the transfer rate of the user data, in addition to the presently specified parameters used for establishing a data call. These requirements may include the following parameters: the required level of service (data transfer rate) and the desired level of service (data transfer rate). The desired level of service determines the data transfer rate the mobile station wishes to be able to use. Simultaneously, the desired data transfer rate is also the maximum data transfer rate to be allowed for the mobile station. The required level of service determines the minimum data transfer rate that must be provided for ensuring the continuity of data transmission. If the required data transfer rate cannot be provided, the call set-up is interrupted or the data call is interrupted. These parameters allow the mobile communication network to reduce the data transfer rate if the cell is not capable of providing the desired data transfer rate in connection with call set-up or handover. Thus, the number of calls interrupted or prevented due to the lack of resources decreases.

Instead of transferring the parameters, the mobile station may indicate said minimum and maximum requirements to the mobile communication network in a number of alternative ways, such as by indicating the level of service. The minimum and the maximum requirements used are then selected in accordance with the indicated level of service in the mobile communication network.

In accordance with the present invention, the mobile communication network is able to modify the channel configuration of the data call and thus also the data transfer rate to a desired level once the network resources required therefor are released. In a preferred embodiment of the invention, the mobile communication network may, during a call, or after a call set-up or a handover, modify the channel configuration assigned to a data call to provide down to the minimum required data transfer rate, for releasing network resources in the mobile communication network for serving other traffic, such as new data calls.

BRIEF DESCRIPTION OF THE DRAWINGS

The invention also relates to a mobile communication system for implementing the method.

In the following, the invention will be described in closer detail by way of example with the aid of the preferred embodiments of the invention and with reference to the attached drawings, in which FIGS. 2, 3, 4 and 5 illustrate the TDMA frame structure, FIGS. 6, 7 and 8 are signalling diagrams, which are correspondingly connected with call set-up, handover, and the adjustment of the data transfer rate carried out during a call in accordance with the invention.

THE PREFERRED EMBODIMENTS OF THE INVENTION

The present invention may be applied to high-speed data transfer in most digital TDMA based mobile communication systems, such as the Pan-European digital mobile communication system GSM, DCS1800 (Digital Communication System), UMTS (Universal Mobile Telecommunication System), FPLMTS (Future Public Land Mobile Telecommunication System), etc.

Figure 1:
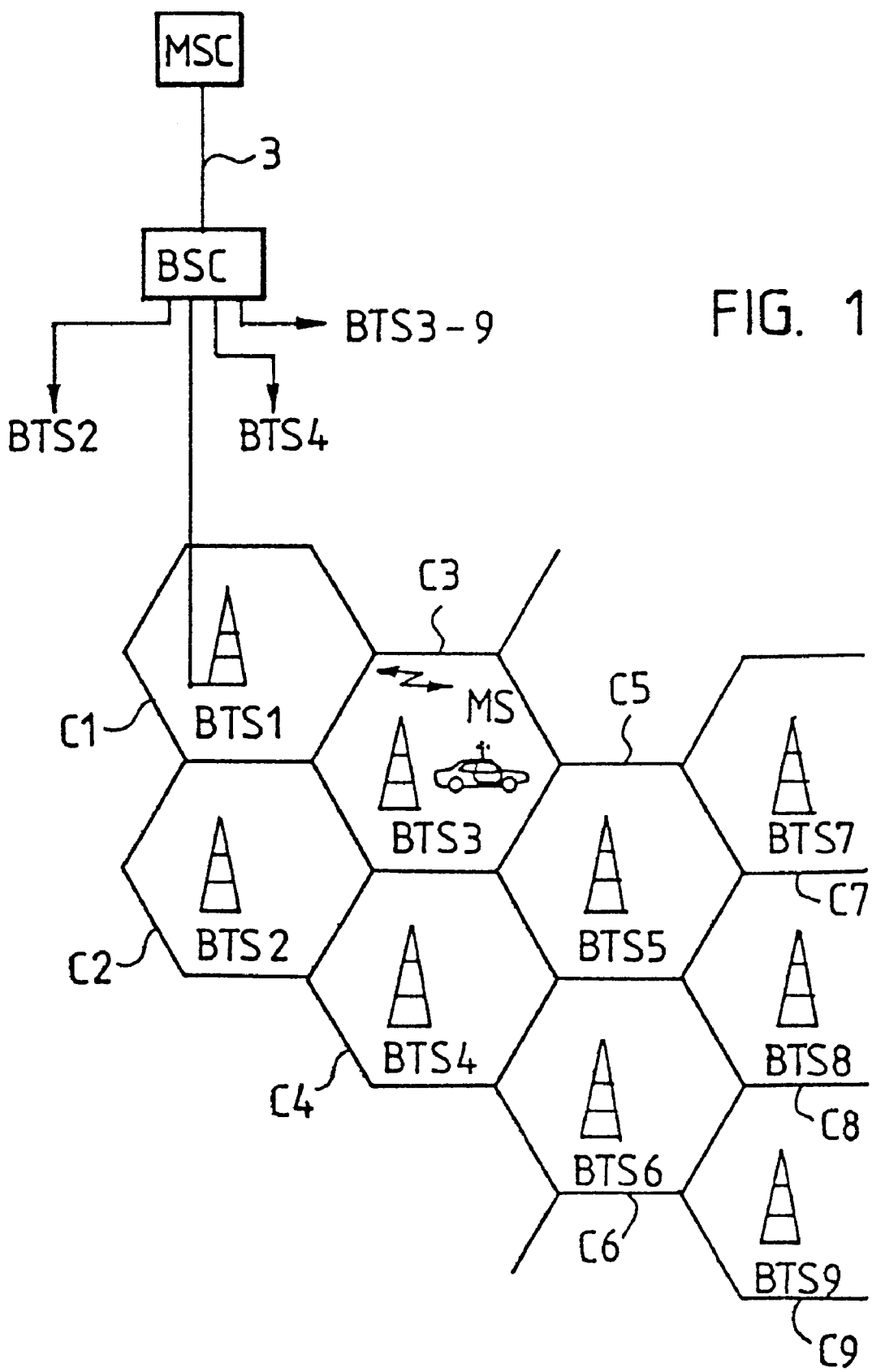
FIG. 1 illustrates a part of the mobile communication system in which the method of the invention may be applied.

FIG. 1 describes a mobile communication system of the same type as GSM by way of example. GSM (Global System for Mobile Communications) is a pan-European mobile communication system. FIG. 1 shows very briefly the basic structure of the GSM system, not paying closer attention to its characteristics or other aspects of the system. The GSM system is described in greater detail in GSM recommendations and in "The GSM System for Mobile Communications", M. Mouly & M. Pautet, Palaiseau, France, 1992, ISBN:2-9507190-0-7, which are incorporated herein by reference.

A mobile services switching centre (MSC) is in charge of switching incoming and outgoing calls. It performs similar operations as the exchange of a public switched telephone network (PSTN). In addition, it also performs operations typical of mobile telecommunication only, such as subscriber location management, jointly with the subscriber registers of the network. The GSM system contains at least such subscriber registers as home location register (HLR) and visitor location register (VLR), which are not shown in FIG. 1. Specific information on the location of the subscriber, such as the location area, are stored in a visitor location register VLR, the number of which is typically one per each mobile services switching centre (MSC). The location data in the HLR, in turn, indicates the VLR within the area of which a mobile station MS is located. Mobile stations MS are switched to the MSC by means of base station systems. A base station system BSS comprises a base station controller BSC and base stations BTS. One BSC is used for controlling several BTSs. The tasks of the BSC include e.g. handovers in such cases in which handover is performed within a base station or between two base stations both controlled by the same BSC. FIG. 1 shows for clarity one base station system only, in which a base station controller BSC is connected with nine base stations BTS1–BTS9, having coverages which, in turn, provide corresponding radio cells C1–C9.

The GSM system is a time division multiple access (TDMA) method in which time-division traffic takes place on the radio path in successive TDMA frames each of which consists of several time-slots. In each time-slot, a short information packet is sent in form of a radio frequency (RF) burst which has a finite duration and which consists of a set of modulated bits. The time-slots are mainly used for conveying control channels and traffic channels. On the traffic channels, speech and data are transmitted. On the control channels, signalling between a base station and mobile subscriber stations is carried out.

Channel structures used in the radio interface of the GSM system are defined in closer detail in the ETSI/GSM recommendation 05.02. The TDMA frame structure of the GSM system is illustrated by way of example in FIGS. 2–5. FIG. 5 shows one TDMA basic frame which includes eight time-slots 0–7 used as traffic channels or control channels. Only one RF burst shorter than the duration of the time-slot is thus transmitted in each time-slot. Once one TDMA basic frame ends in time-slot 7, the time-slot 0 of the following basic frame immediately begins. Thus, 26 or 51 successive TDMA frames form one multiframe depending on whether a traffic channel or a control channel structure is in question, as illustrated in FIG. 4. A superframe, in turn, consists of 51 or 26 successive multiframes depending on whether the multiframes have 26 or 51 frames, as illustrated in FIG. 3. A hyperframe consists of 2048 superframes, as illustrated in FIG. 2.

In normal operation, a mobile station MS is assigned at the beginning of a call one time-slot as a traffic channel from one of the carrier frequencies (single-slot access). The mobile station is synchronized with the assigned time-slot for transmitting and receiving RF bursts.

In data transfer in accordance with the invention, when a mobile station MS requires a data transfer rate higher than can be provided by one traffic channel for transmission of user data, said MS is assigned a channel or a time-slot configuration that comprises two or more time-slots from one or more time-slots in one or several frames by means of a so-called multi-slot access technique. It is not essential to the present invention which multi-slot access technique is used. An example of a multi-slot access technique for which the present invention is well suited is disclosed in PCT/FI95/00248 and PCT/FI95/00249. In these applications, a high-speed signal is multiplexed to several low-speed channels (time-slots), transferred over the radio path and demultiplexed in a receiver back to one signal. These documents are incorporated herein by reference.

As it has been stated previously, however, problems arise in connection with the multi-slot access technique if there is not a sufficient number of channels available. This may occur in the call set-up phase and also in connection with handover.

In accordance with the present invention, the minimum and the maximum requirements for the data transfer rate of user data are indicated by the mobile station to the mobile communication network at the beginning of call set-up. Said requirements are two new parameters, in addition to the presently specified parameters used for establishing a data call. Indicating the requirements to the mobile communication network refers herein to all the manners in which the mobile station can indicate the minimum and the maximum requirements, without limiting e.g. to direct transmission of the requirements as such. For example, the mobile station may indicate a desired level of service, in which case the MS is provided at least the performance of the data channel defined by the minimum requirement for this level of service, but not more than the performance of the data channel defined by the maximum requirement for this level of service.

In the following examples, these minimum and maximum requirements are defined with parameters "required level of service" and "desired level of service", but the requirements may be defined in other ways, as well. The desired level of service determines the data transfer rate, i.e. the channel configuration provided by one or more traffic channels or time-slots that the mobile station wishes to be able to use. Simultaneously, this desired data transfer rate is also the maximum data transfer rate to be allowed to the mobile station. The required level of service determines the minimum data transfer rate that must be provided for ensuring the continuity of data transfer. With the aid of these parameters, the mobile communication network may, depending on the resources of the network, assign a data call a data transfer rate which is within the limits of the desired data transfer rate and the required data transfer rate. Provided that not even the minimum data transfer rate can be provided, the data call or the call set-up is interrupted. It is also possible in some situations that the specific requirements set by the mobile station for the minimum level of service and the minimum data transfer rate are optional, i.e. the MS does not give any specific rate, but leaves the minimum performance to be freely chosen by the mobile communication network.

In accordance with the invention, the data transfer rate assigned to the mobile station for a data call is dynamically adjusted within the limits of the required data transfer rate and the desired data transfer rate depending on the resources of the mobile communication network. The mobile communication network may, in connection with call set-up or handover, assign the data call a smaller time-slot configuration, i.e. less time-slots than the maximum requirement for the data transfer rate if the network resources are not available for providing a desired channel configuration, and thus a desired data transfer rate at that particular moment. The required network resources may, however, be released and available later, in which case it would be possible to move over to a higher data transfer rate.

For this reason, the mobile communication network of the invention modifies the channel configuration, and thus the data transfer rate of the data call to a desired level of service when the resources required therefor are released and available later in the same cell. In a preferred embodiment of the invention, the mobile communication network may, during a call, even after a call set-up or a handover, reduce the channel configuration assigned to a data call, however, only down to the channel configuration corresponding to the minimum requirements for the transfer rate of user data, for releasing resources in the mobile communication network for serving other traffic.

Figure 7:
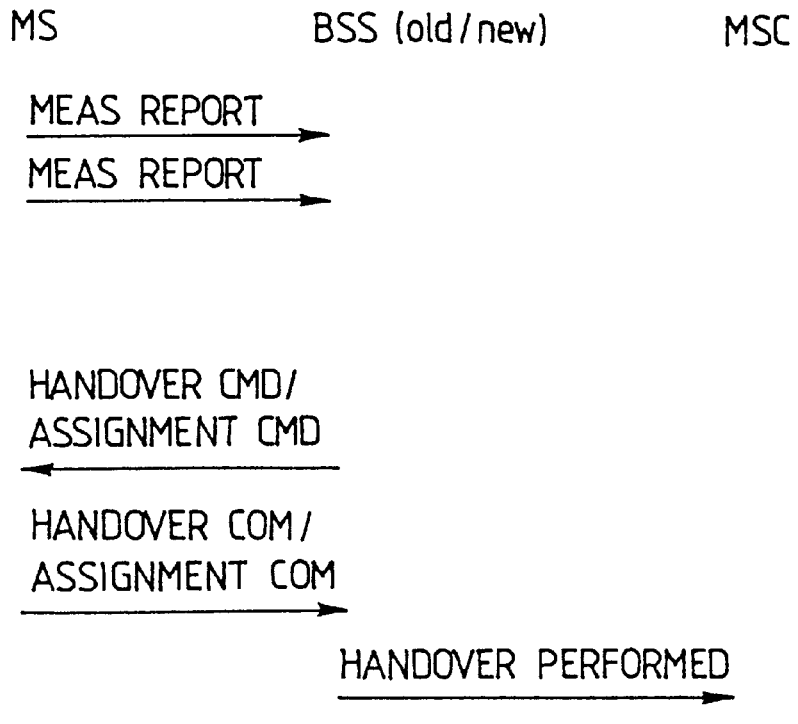
Figure 8:
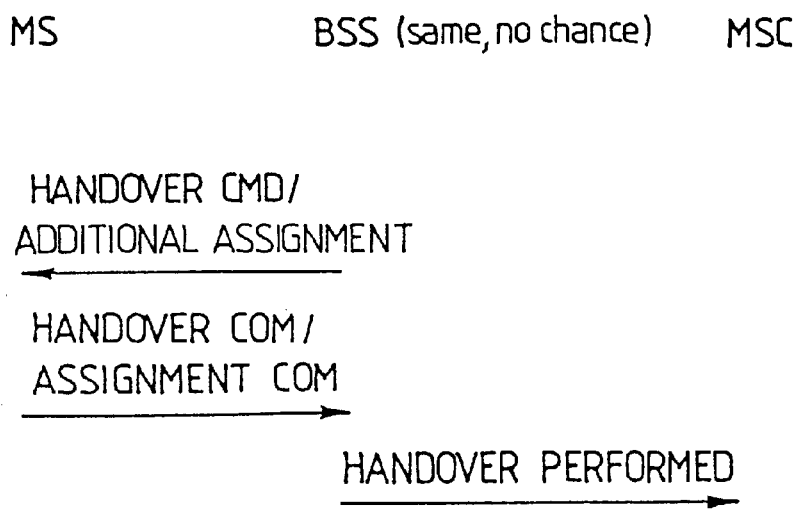

In the following, the invention will be described in closer detail by way of example, in connection with handover within a base station system BSS (FIG. 7) and adjustment of the data transfer rate carried out during a call (FIG. 8). Other typical handover situations, which are not paid closer attention to herein, are handover between base station systems BSS as well as handover between mobile services switching centres MSC.

FIG. 6 shows, in connection with call set-up, only the signalling that is essential to disclosing the invention. It must be noted, however, that in addition to the described signalling messages, other messages are also transmitted in connection with the call set-up, which are not shown herein for clarity, however. As to the GSM system, for instance, this signalling is precisely defined in the GSM specifications concerning call set-up.

In FIG. 6, normal call set-up signalling takes place first, whereafter the MS sends a call set-up message SETUP, which is forwarded to the MSC. In accordance with the invention, the SETUP message contains, in addition to the parameters normally required for setting up a data connection, two new parameters, the maximum desired data transfer rate DRMAX and the minimum required data transfer rate DRMIN. In the SETUP message of the GSM system, these parameters may be included in a Bearer Capability Information Element BCIE. The BCIE is disclosed in the GSM recommendation 04.08, version 4.7.0, pages 435–443. The MSC sends a serving BSC an assignment request message (Assignment REQ), which is modified to contain parameters DRMAX and DRMIN. The BSC checks whether it has a sufficient capacity for serving the data call, and assigns the data call, depending on the current capacity, some time-slot configuration corresponding to the data transfer rate, which is within the limits of parameters DRMAX and DRMIN. Thereafter, the BSC sends the BTS serving the MS an assignment command message (Assignment Command), which contains the information on the time-slots assigned to the data call and on the assigned data transfer rate. The BTS sends the MS an assignment command message (Assignment Command), which contains the information on the time-slots assigned to the data call and on the assigned data transfer rate. The MS starts to prepare for data transfer in the assigned time-slots at the assigned data transfer rate, and sends the BTS an assignment acknowledgement (Assignment Complete). The BTS sends the BSC an acknowledgement (Assignment Complete). The BSC, in turn, sends the MSC an assignment acknowledgement (Assignment Complete), which contains the information on the data transfer rate assigned to the data call by the BSC. After this, normal call set-up signalling takes place for starting the transfer.

If the base station controller BSC is not capable of assigning the data call the time-slot configuration corresponding to the minimum required data transfer rate DRMIN due to lack of network resources, it will send a report to the MSC, in form of an Assignment Failure message. Then the MSC interrupts the call set-up. The network resources that determine the data transfer rate to be assigned to the data call include at least the traffic channels, i.e. the time-slots that are available at the BTS serving the MS at that particular moment.

FIG. 7 shows only the signalling that is essential to disclosing the invention. However, it must be noticed that in addition to the signalling messages described above, other messages are also sent in a handover situation, although these messages are not described herein for clarity. As to the GSM system, for instance, this signalling is precisely defined in the GSM specifications concerning call set-up.

In the intra-BSS handover illustrated in FIG. 7, the MS regularly reports the measurement results of the downlink signals of the adjacent cells to the BSC of the serving BSS (Meas Report). The BSC makes the handover decisions on the basis of the criteria of the radio path by utilizing these measurements, or for other reasons, such as for distributing the capacity. After making the handover decision, the BSC assigns the data call, depending on at least the time-slot resources of the target cell of the handover, a channel configuration that provides a data transfer rate which is St least the minimum required data transfer rate DRMIN and not higher than the maximum desired data transfer rate DRMAX. The data transfer rate (time-slot configuration) provided by the new cell is not necessarily the same as that provided by the previous cell. In other words, the data transfer rate may increase or reduce in the new cell in accordance with the available resources and within the limits of parameters DRMAX and DRMIN. Either the BSC or the BTS stores parameters DRMAX and DRMIN for every MS that is located within their area and has an ongoing high-speed data call. Provided that the minimum required data transfer rate cannot be provided, the call or the handover attempt will be interrupted, and an adjacent cell, second best in terms of other criteria and able to provide an adequate data transfer rate, will be selected as the new target cell for handover. The BSC sends the MS a handover command message (Handover Command), which contains the information on the assigned data transfer rate, and the description of the assigned time-slots. Now the MS is able to start communication with the channel configuration assigned in the new cell, and it sends an acknowledgement (Handover Completed) to the BSS. The BSS, in turn, sends the message Handover Performed to the MSC.

FIG. 8 illustrates the adjustment of the data transfer rate during a call in accordance with the invention. The BSS detects that there are free time-slot resources available in the BSS for a data call the current channel configuration (the number of time-slots) and the corresponding data transfer rate of which are lower than the desired channel configuration, and the corresponding maximum desired data transfer rate DRMAX of the MS. In that case, the BSS commands the MS to use a higher data transfer rate and a number of time-slots, by means of an intra-BTS handover or a new channel assignment. In other words, the BSS assigns the data call a new channel configuration in the same cell and sends the MS a handover command message (Handover Command) or an additional channel assignment message (Additional Assignment), containing the information on the assigned data transfer rate and the description of the assigned time-slots. Now the MS is able to start communication with the new, assigned channel configuration in the same cell, and it sends an acknowledgement Handover Complete (or Assignment Complete) to the BSS. The BSS, in turn, sends the Handover Performed message to the MSC.

Correspondingly, it is possible to reduce the channel configuration (number of time-slots), and thus the data transfer rate of the data calls, but, only down to the minimum requirement for the user data transfer rate of each data call, when the BSS detects that time-slots are needed for other traffic in the cell. The BSS then assigns the data call a new channel configuration and reports it to the MS as described above with reference to FIG. 8. The channel configurations assigned to data calls may be adjusted e.g. so that the mobile communication network is able to serve as many connection requests as possible, while simultaneously keeping the channel configuration assigned to each data call as high as possible within the limits of said minimum and maximum requirements.

The figures and the explanation associated therewith are only intended to illustrate the present invention. The method of the invention may vary in its details within the scope of the attached claims.

What is claimed is:

1. A method for data transmission in a time division multiple access (TDMA) mobile communication system, in which one or more time-slot channels may be allocated to a mobile station for data transmission, comprising:
   determining a desired level of service for the mobile station during a data call,
   dynamically adjusting a number of time slots per a TDMA frame assigned to the mobile station during the data call within limits of said desired level of service, the dynamic adjusting comprising:
   detecting that there are time-slot resources available in a cell,
   detecting in the cell at least one data call, an assigned number of time slots per frame of which fails to meet said desired level of service,
   allocating said at least one data call to a configuration having a higher number of time slots,
   sending from a base station system to the mobile station a handover command message or an additional channel assignment message including information on the allocated channel configuration in the cell.

2. A method as claimed in claim 1, further comprising:
   indicating said desired level of service in terms of a maximum requirement for a data transfer rate of the mobile station or a time slot configuration of the data call.

3. A method as claimed in claim 1, further comprising:
   indicating said desired level of service in terms of a maximum requirement and a minimum requirement for a data transfer rate of the mobile station or a time slot configuration of the data call.

4. A method as claimed in claim 1, further comprising:
   adjusting configurations assigned to the data call so that a mobile communication network simultaneously serves as many requested connections as possible while keeping the number of channels assigned to the data call as high as possible within the limits of said desired level of service.

5. A method as claimed in claim 1, further comprising:
   increasing the number of channels assigned to the data call, after a call set-up or a handover, as soon as there are adequate resources available in a serving mobile communication network, such that said desired level of service of the data call is obtained.

6. A method as claimed in claim 1, wherein said resources of a mobile communication network comprise at least the time-slot resources of a serving cell and/or the time-slot resources of a target cell for handover.

7. A method as claimed in claim 1, further comprising:
   the mobile station indicating a maximum desired level of service, and a mobile communication network selecting a minimum level of service.

8. A method for data transmission in a time division multiple access (TDMA) mobile communication system, in which one or more time-slot channels may be allocated to a mobile station for data transmission, comprising:
   determining a desired level of service for the mobile station during a data call,
   dynamically adjusting a number of time slots per frame assigned to the mobile station during the data call within limits of said desired level of service, the dynamic adjusting comprising:

detecting a shortage of free time-slots in a cell, detecting in the cell at least one data call, the desired service level of which allows a channel configuration having a lower number of time slots per frame than a current channel configuration assigned to said at least one data call, allocating said at least one data call to the lower channel configuration, sending from a base station system to the mobile station a handover command message or an additional channel assignment message including information on the allocated channel configuration in the same cell.

9. A method as claimed in claim 8, further comprising:

decreasing the number of channels assigned to the data call, after a call set-up or a handover, wherein resources in a mobile communication network are released.

10. A time division multiple access (TDMA) mobile communication system, in which one or more time-slot channels may be allocated to a mobile station for data transmission, wherein:

the mobile communication system is arranged to dynamically adjust a channel configuration including one or more time slots per a TDMA frame assigned to the mobile station for a data call, the channel configuration being adjusted within limits of a desired level of service of said data call based on a varying allocation state of resources of the mobile communication system.

11. A system as claimed in claim 10, wherein an indication of said desired level of service is in terms of a maximum requirement for a user data transfer rate or a time slot configuration of the data cell.

12. A system as claimed in claim 10, wherein an indication of said desired level of service is in terms of a maximum requirement and a minimum requirement for a user data transfer rate or a time slot configuration of the data call.

13. A system as claimed in claim 10, wherein a minimum level of service is undefined by the mobile station.

14. A system as claimed in claim 10, wherein a minimum level of service is selectable by the mobile communication system.

15. A system as claimed in claim 10, wherein said resources of the mobile communication system include at least the time-slot resources of a serving cell and/or the time-slot resources of a target cell for handover.

* * * * *